(12) United States Patent
Dembowsky et al.

(10) Patent No.: US 6,817,817 B2
(45) Date of Patent: Nov. 16, 2004

(54) FLUID-TIGHT, ADJUSTABLE AND SELF-LOCKING THREADED CONNECTION ASSEMBLY

(75) Inventors: Hans-Joachim Dembowsky, Hamburg (DE); Theodor Wenniges, Salzkotten-Veme (DE); Rainer Süssenbach, Stadthagen (DE)

(73) Assignee: Bollhoff GmbH, Bielefeld (DE)

( * ) Notice: Subject to any disclaimer, the term of this patent is extended or adjusted under 35 U.S.C. 154(b) by 0 days.

(21) Appl. No.: 10/253,093

(22) Filed: Sep. 24, 2002

(65) Prior Publication Data

US 2003/0059274 A1 Mar. 27, 2003

(30) Foreign Application Priority Data

Sep. 25, 2001 (DE) .......................... 101 47 141

(51) Int. Cl.$^7$ .......................... F16B 33/00; F16B 43/02
(52) U.S. Cl. .......................... 411/369; 411/38; 411/424; 411/542
(58) Field of Search .............. 411/411, 424, 411/183, 34, 38, 369, 376.1, 542

(56) References Cited

U.S. PATENT DOCUMENTS

| | | | | |
|---|---|---|---|---|
| 2,001,290 A | * | 5/1935 | Thomson | 411/371.1 |
| 3,635,272 A | * | 1/1972 | Scheffer | 411/303 |
| 4,498,680 A | * | 2/1985 | Schobbe | 277/641 |
| 4,741,571 A | * | 5/1988 | Godette | 296/107.07 |
| 5,080,547 A | * | 1/1992 | Moghe | 411/436 |
| 5,108,238 A | * | 4/1992 | Ewing | 411/5 |
| 5,165,834 A | * | 11/1992 | Takenouchi et al. | 411/542 |
| 5,333,978 A | * | 8/1994 | Rives | 411/389 |
| 5,540,528 A | | 7/1996 | Schmidt et al. | |
| 5,694,719 A | * | 12/1997 | Bejune et al. | 49/502 |

FOREIGN PATENT DOCUMENTS

| | | | |
|---|---|---|---|
| DE | 1575249 | | 1/1970 |
| DE | 1775091 | | 6/1971 |
| DE | 25 03 307 | | 7/1976 |
| DE | 39 26 000 C1 | | 8/1990 |
| DE | 100 12 488 A1 | | 9/2001 |
| EP | 0 373 641 A3 | | 6/1990 |
| EP | 0 533 513 A1 | | 3/1993 |
| EP | 1 085 221 A1 | | 3/2001 |
| GB | 854830 | | 11/1960 |
| GB | 2310904 | * | 9/1997 |
| JP | 2-42204 | * | 2/1990 |
| WO | 02/081936 | * | 10/2002 |

* cited by examiner

Primary Examiner—Thomas B. Will
Assistant Examiner—Thomas A Beach
(74) Attorney, Agent, or Firm—Seyfarth Shaw LLP

(57) ABSTRACT

A fluid-tight, adjustable and self-locking threaded connection assembly comprising a nut and a bolt. The nut which is adapted to be fixed to a first structural member has a bore comprising a threaded portion and a smooth cylindrical portion. The bolt which is adapted to be removably connected to a second structural member has an intermediate portion provided with a plurality of circumferential sealing lips. The sealing lips are dimensioned with respect to said smooth cylindrical portion of the nut bore such that it is slidingly urged against said smooth portion of the nut bore when the bolt is adjusted relative to the nut. As a result thereof the threaded connection assembly is fluid-tight and self-locking while being adjustable.

19 Claims, 2 Drawing Sheets

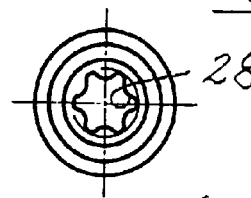
Fig. 3
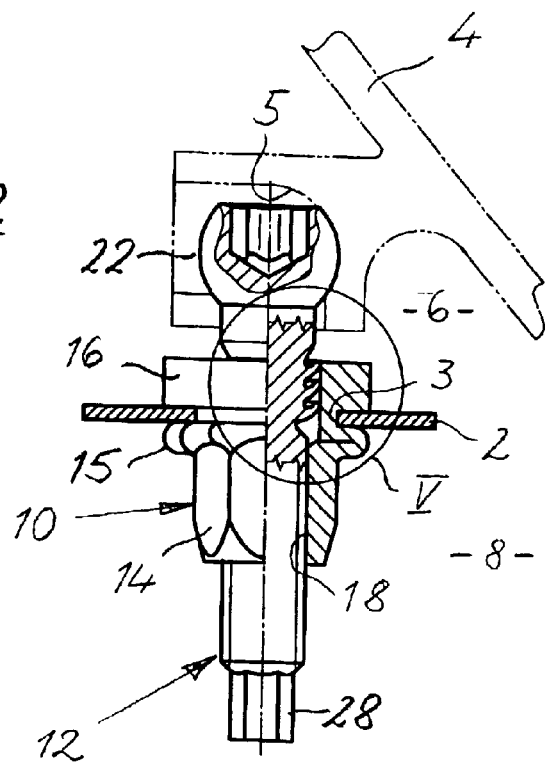
Fig. 1
Fig. 2
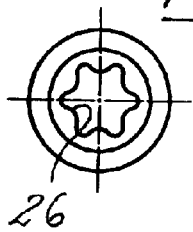
Fig. 4
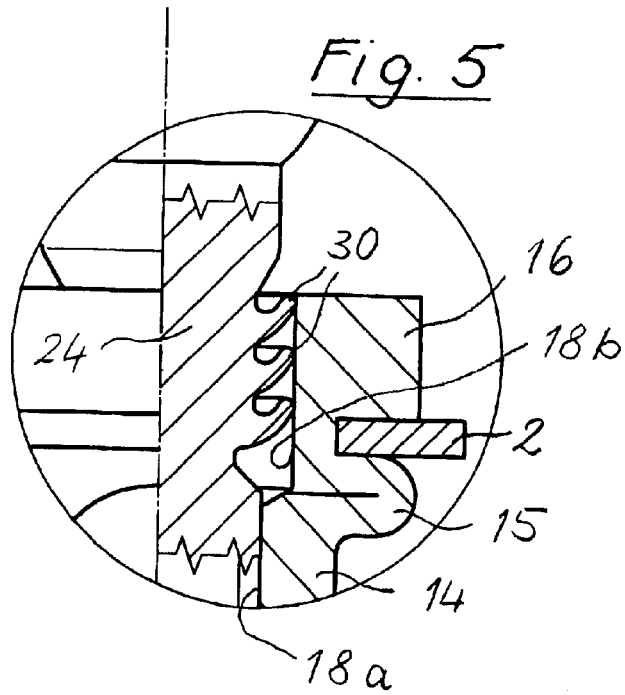
Fig. 5

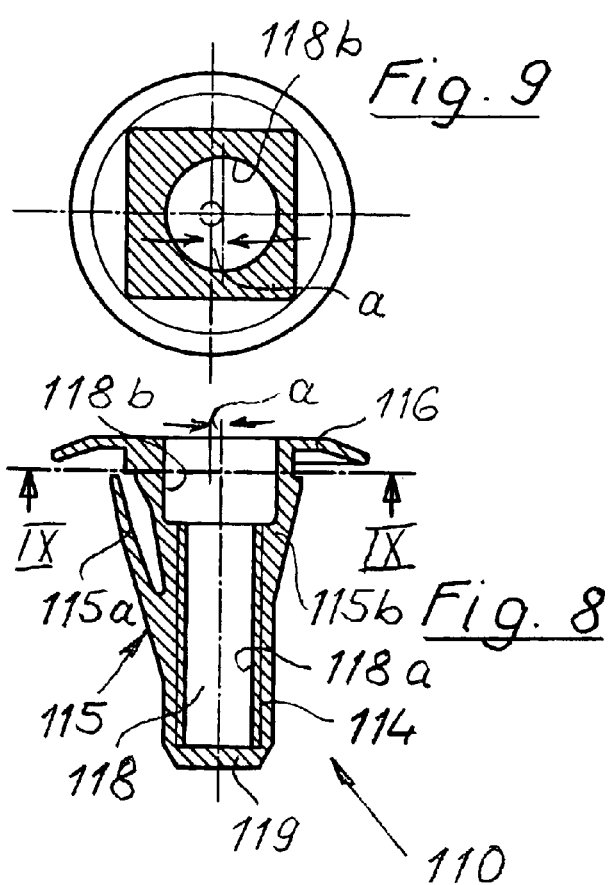

FLUID-TIGHT, ADJUSTABLE AND SELF-LOCKING THREADED CONNECTION ASSEMBLY

BACKGROUND

The present invention relates to a threaded connection assembly comprising a nut and a bolt.

A great number of various threaded connection assemblies have become known. For certain applications it is desired to have a threaded connection assembly the bolt of which can be adjusted relative to the nut and which is self-locking when in the adjusted position. Furthermore, it may be desirable for the threaded connection assembly to be and to remain fluid-tight when the threaded connection assembly is being adjusted.

Such a threaded connection assembly may be used for example for mounting a backlight of a vehicle to a metal sheet of the vehicle body. Generally, there is a gap between the backlight and other vehicle body members, which gap should be minimal for aesthetic reasons. Minimizing said gap is to be enabled by adjustment of the threaded connection assembly. To ensure that the backlight will remain in its adjusted position irrespective of impacts and vibrations of the vehicle body, the threaded connection assembly should be self-locking. Finally, the threaded connection assembly should be designed so that no liquids or other contaminants leak through the threaded connection assembly into the interior of the backlight.

SUMMARY

It is an object of the present invention to provide a threaded connection assembly which is fluid-tight, adapted to be adjustable in position and self-locking.

The present invention provides a threaded connection assembly comprising a nut adapted to be inserted and mounted into a hole of a first structural member and having a bore comprising a threaded portion and a smooth portion, and a bolt comprising a threaded stem adapted to threadingly engage said threaded portion of the nut bore, a first coupling portion adapted to be connected to a second coupling portion of a second structural member, and an intermediate portion positioned between said threaded shaft and said first coupling portion.

In accordance with the present invention the intermediate portion of the bolt is provided with one or a plurality of circumferential sealing lips dimensioned with respect to a smooth, preferably cylindrical portion of the nut bore such that it resiliently engages said smooth portion of the nut bore so that the threaded connection assembly will be self-locking and fluid-tight when being in its adjusted position.

Preferably the bolt is made of an impact resistant plastic material such as polyamide including a fibre reinforcement, in particular a glass fibre reinforcement, in order to enable resilient deflection of the sealing lips of the bolt. The nut can be made of metallic or plastic material.

The nut can be a blind rivet nut. As an alternative the nut may comprise a clip adapted to be snappingly received in a hole of the associated structural member.

BRIEF DESCRIPTION OF THE DRAWINGS

For the purpose of facilitating and understanding of the invention sought to be protected, there is illustrated in the accompanying drawings embodiments thereof, from an inspection of which, when considered in connection with the following description, the invention sought to be protected, its construction and operations, and many of its advantages should be readily understood and appreciated.

FIG. 1 shows a first embodiment of a threaded connection assembly in an assembled condition;

FIG. 2 is a side elevation of a bolt of the threaded connection assembly in FIG. 1;

FIG. 3 is a bottom view of the bolt in FIG. 2;

FIG. 4 is a top view of the bolt in FIG. 2;

FIG. 5 is an enlarged view of a detail within a circle V in FIG. 1;

FIG. 6 is a partially sectioned view of a second embodiment of a threaded connection assembly in an assembled condition;

FIG. 7 shows a hole of one of the two structural members to be connected to each other by the threaded connection assembly in FIG. 6;

FIG. 8 is a longitudinal section through the nut of the threaded connection assembly in FIG. 6;

FIG. 9 is cross-sectional view in the plane IX—IX in FIG. 8;

FIG. 10 is side elevation of the nut of FIG. 8 while it is being assembled to a structural member.

DETAILED DESCRIPTION

Referring to FIG. 1, there is illustrated a threaded connection assembly for connecting a structural member 2 and a structural member 4. The structural member 2, which is provided with a hole 3, is e.g. a metal sheet of a vehicle body (not shown), while the structural member 4 is e.g. a holder for a backlight (not shown) of the vehicle. As set forth above, the backlight and other vehicle parts are separated from each other by a gap (not shown) which is to be minimized by adjustment of the threaded connection assembly. In order to ensure that the threaded connection assembly will remain in its adjusted position irrespective of impacts and vibrations of the vehicle, the threaded connection assembly should be self-locking. Furthermore, it should be fluid-tight so that no fluids such as water, oil and/or fuel vapours etc. may enter the interior 6 of the vehicle body from the environment 8.

The threaded connection assembly comprises a nut 10 and a bolt 12. In the embodiment shown in FIG. 1, the nut 10 is a blind rivet nut of a substantially conventional type. As shown, the nut 10 comprises a body 14 and an integral flange 16, and is provided with a through-bore 18. The through-bore 18 (see FIG. 5) comprises a threaded portion 18a and an adjacent smooth cylindrical portion 18b of an increased diameter. The smooth cylindrical portion 18b of the through-bore 18 is of substantially large axial extent for reasons as set forth below.

As shown in FIG. 1 and in particular in FIG. 2, the bolt 12 comprises a threaded stem 20, a coupling portion 22 and an intermediate portion 24. The intermediate portion 24 is connected to the coupling portion 22 by a cylindrical portion 32. The coupling portion 22 is formed as a ball-shaped male part which is received within a ball-shaped female part of a coupling portion 5 of the structural member 4 when the threaded connection assembly is in its assembled condition (FIG. 1). The coupling portions 5 and 22 form a releasable coupling between the bolt 12 and the structural member 4 to provide for limited, three-dimensional pivotal movements between these components. It should be noted, however, that the releasable coupling between the bolt 12 and the structural member 4 could be of any other suitable type.

The coupling portion 22 of the bolt 12 has drive means 26 formed as a hexagonal recess with rounded sides (FIG. 4). The threaded portion 20 has its end remote from the coupling portion 22 provided with drive means 28 which are formed as a hexagonal projection with rounded sides (FIG. 3). The drive means 26 and 28 enable coarse and fine adjustments of the bolt as will be explained below.

The intermediate portion 24 has three circumferential sealing lips 30. It is to be noted that there could be provided more or less sealing lips for other applications. The sealing lips 30 serve, on the one hand, as sealing means and, on the other hand, as securing means for preventing the bolt from being loosened, as will be explained in more detail below.

For assembling of the threaded connection assembly shown in FIG. 1, the nut 10 is inserted from above into the hole 3 of the structural member 2. The hole 3 of the nut 10 is of non-circular shape for preventing the nut 10 from being rotationed. The nut 10 is a blind rivet nut and will be clamped between the flange 16 and the structural member 2 by a conventional blind rivet setting tool (not shown) which is used to insert a steel mounting spindle into the threaded portion 18a of the nut bore 18 and to fold the nut so as to form a bead 15. Thereafter, the bolt 12 can be threadily engaged into the nut bore 18.

In the embodiment of FIG. 1 the nut bore 18 is a through-bore so that it is open at both ends. The bolt 12 has its drive means 28 project beyond the bottom end of the nut 10. As a result the drive means 26 of the coupling portion 22 allow for coarse adjustments of the bolt 12. When the structural member 4 will have been connected to the bolt 12 via the coupling portions 5 and 22, the drive means 28 at the bottom end of the bolt 12 allow for fine adjustments of the threaded connection assembly.

When the bolt 12 is being screwed into the nut 10, the sealing lips 30 move into the smooth cylindrical portion 18b of the nut bore 18. As shown in particular in FIG. 5, the sealing lips 30 are dimensioned with respect to the diameter of the smooth cylindrical portion 18b such that they are urged against the wall of the smooth cylindrical portion 18b by a predetermined force so as to be slightly deflected. It is to be noted that such resilient deflection of the sealing lips 30 has been exaggerated in FIG. 5 for clarity reasons. The outer diameter of the sealing lips 30 is chosen such that, irrespective of any manufacturing tolerances, a sufficient engagement force will be generated in order to provide for self-locking of the threaded connection assembly.

To enable the sealing lips 30 to perform this double function, they must be resiliently deflectable similar to Belleville springs. To this end, the bolt 12 is made of an impact resistant plastic material such as polyamide. The plastic material contains reinforcement fibres such as a glass fibre reinforcement. The blind rivet nut 10 is made of metal, in particular steel, and generally is manufactured by a cold forging process.

The FIGS. 6 to 10 show a second embodiment of a threaded connection assembly for connecting the structural members 2 and 4. Components which are similar to components of the preceding embodiment have been designated by the same reference numerals. Comparable, however, modified components have been designated by the reference numerals of the preceding embodiment, however increased by 100.

The embodiment of the FIGS. 6 to 10 differs from the preceding embodiment basically by the design of the nut 110. The nut 110 is a clip which can be snapped into the hole of the structural member 2. To this end the nut 10 has its upper end provided with a spring disk 116 integral with the body 114. Furthermore, the body 114 has integral snapping means 115. The snapping means 115 comprise a spring arm 115a which extends from one side of the body 114 upwards under an acute angle, and a solid snapping projection 115b provided on the side of the body 114 opposite the spring arm 115a and having a snapping shoulder. The free end of the spring arm 115a and the snapping shoulder of the snapping projection 115b are disposed in a common radial plane which is spaced from the bottom side of the spring disk 116 such that the plate-shaped structural member 2 is clamped between the spring disk 116 and the upper ends of the snapping means 115 when the threaded connection assembly has been assembled.

For assembling the threaded connection assembly, the nut 110 is snapped into the hole 3 of the structural member 2. The hole 3 is of square cross section as shown in FIG. 7, with the cross section of the nut 10 being matingly shaped. For snapping the nut 110 into the hole 3 of the structural member 2 the nut 110 is inserted into the hole 3 while being inclined thereto, such that the snapping shoulder of the snapping projection 115b engages below the structural member 2 as shown in FIG. 10. Thereafter the nut 110 is urged downwards by engagement on the opposite side. As a result thereof the spring arm 115a is being deflected inwards. When the nut 110 has been completely inserted into the hole 3, the spring arm 115 snaps outwards so that the structural member 2 is resiliently clamped between the spring disk 116 and the upper ends of the snapping means 115. Due to the resiliency of the spring arm 115a the nut 110 may be readily snapped into the hole 3 of the structural member 2, while the solid snapping projection 115b on the opposite side ensures that the nut 10 is securely held and retained by the structural member 2.

As shown in FIGS. 8 and 9, the central axis of the smooth cylindrical portion 118b of the nut bore 118 is positioned so as to be offset to the central axis of the threaded portion 118a by a distance a. As a result the nut 10 can be adjusted in a transverse direction by an amount 2×a by being rotated about its longitudinal axis in order to compensate for misalignments of the structural member 4 relative to the structural member 2.

A further difference of the embodiment of FIGS. 6 to 10 from the preceding embodiment is that the nut 10 has a closed lower end 119. In view thereof the bolt 12 has no lower drive means 28. However, it is to be understood that also in this embodiment the bore 118 of the nut 110 could be open at both ends while in the embodiment of FIGS. 1 to 5 the bore 18 of the nut 10 could have a closed lower end.

In the embodiment of FIGS. 6 to 10 the nut 110 is made of a plastic material such as an impact resistant modified polyamide 6 to provide for sufficient resiliency and strength of the nut, in particular of the spring disk 116 and the spring arm 115a.

We claim:

1. A threaded connection assembly comprising:
    a nut adapted to be inserted and mounted into a hole of a first structural member and having a bore comprising a threaded portion and a smooth portion, and
    a bolt comprising a threaded stem adapted to threadingly engage said threaded portion of the nut bore, a first coupling portion adapted to be connected to a second coupling portion of a second structural member, and an intermediate portion positioned between said threaded stem and said first coupling portion,
    said first coupling portion of the bolt comprising a spherical male part and said second coupling portion of the second structural member comprising a spherical female part, said intermediate portion of the bolt being provided with at least one circumferential sealing lip dimensioned with respect to said smooth portion of the nut bore such that said at least one circumferential sealing lip engages said smooth portion of the nut bore in fluid-tight and self-locking relationship.

2. The threaded connection assembly of claim 1, wherein said intermediate portion of the bolt has three circumferential sealing lips adapted to engage said smooth portion of the nut bore.

3. The threaded connection assembly of claim 1, wherein said first coupling portion of the bolt is provided with drive means for engagement by a bolt adjustment tool.

4. The threaded connection assembly of claim 1, wherein said nut bore is a through-bore open at both ends thereof.

5. The threaded connection assembly of claim 4, wherein said threaded portion of the bolt is provided with drive means for engagement by a bolt adjustment tool.

6. The threaded connection assembly of claim 1, wherein said nut bore has an open end and an opposite closed end.

7. The threaded connection assembly of claim 1, wherein said nut is a blind rivet nut.

8. The threaded connection assembly of claim 1, wherein said nut comprises a clip adapted to be snappingly received in the hole of said first structural member.

9. The threaded connection assembly of claim 8, wherein said nut has one end provided with a spring disk adapted to resiliently engage a first surface of said first structural member.

10. The threaded connection assembly of claim 9, wherein said nut is provided with locking means adapted to engage a second surface of said first structural member opposite said first surface thereof.

11. The threaded connection assembly of claim 10, wherein said locking means comprise a projecting and resiliently deflectable spring arm and a diametrically opposite solid locking projection with a locking shoulder.

12. The threaded connection assembly of claim 1, wherein said smooth portion of the nut bore is positioned so as to be eccentric with respect to said threaded portion of the nut bore in a transverse direction.

13. The threaded connection assembly of claim 1, wherein said bolt is made of an impact resistant plastic material.

14. The threaded connection assembly of claim 13, wherein said impact resistant plastic material is polyamide.

15. The threaded connection assembly of claim 13, wherein said impact resistant plastic material includes fibre reinforced material.

16. The threaded connection assembly of claim 13, wherein said nut is made of metallic or plastic material.

17. The threaded connection assembly of claim 1, wherein said first structural member comprises a plate and said hole of said first structural member is of non-circular shape for preventing said nut from rotational movements.

18. The threaded connection assembly of claim 1, wherein said second structural member comprises a holder for a backlight of a vehicle, a gap being provided between said backlight and another vehicle member and being adapted to be minimized by adjustment of the threaded connection assembly.

19. A threaded connection assembly comprising:

a nut adapted to be inserted and mounted into a hole of a first structural member and having a bore comprising a threaded portion and a smooth portion, and a bolt comprising a threaded stem adapted to threadingly engage said threaded portion of the nut bore, a first coupling portion adapted to be connected to a second coupling portion of a second structural member, and an intermediate portion positioned between said threaded stem and said first coupling portion, said intermediate portion of the bolt being provided with at least one circumferential sealing lip dimensioned with respect to said smooth portion of the nut bore such that said at least one circumferential sealing lip engages said smooth portion of the nut bore in fluid-tight and self-locking relationship, said second structural member comprising a holder for a backlight of a vehicle, a gap being provided between said backlight and another vehicle member and being adapted to be minimized by adjustment of the threaded connection assembly.

* * * * *